United States Patent [19]

Hirayama et al.

[11] 4,060,322
[45] Nov. 29, 1977

[54] IMAGE INFORMATION HANDLING DEVICE

[75] Inventors: Kazuhiro Hirayama, Yokohama; Yasushi Sato, Kawasaki; Taisuke Tokiwa, Yokohama; Kazuo Kawakubo, Hino; Fujio Iwatate, Tokyo; Hisashi Nakatsui, Kawasaki, all of Japan

[73] Assignee: Canon Kabushiki Kaisha, Tokyo, Japan

[21] Appl. No.: 607,503

[22] Filed: Aug. 25, 1975

Related U.S. Application Data

[63] Continuation-in-part of Ser. No. 607,504, Aug. 25, 1975, and Ser. No. 594,126, July 8, 1975.

[30] Foreign Application Priority Data

| Sept. 9, 1974 | Japan | 49-103642 |
|---|---|---|
| Sept. 12, 1974 | Japan | 49-105257 |
| July 10, 1974 | Japan | 49-79475 |
| Oct. 14, 1974 | Japan | 49-117892 |
| Aug. 22, 1974 | Japan | 49-96500 |
| Sept. 14, 1974 | Japan | 49-106342 |
| Dec. 17, 1974 | Japan | 49-144727 |
| Sept. 11, 1974 | Japan | 49-104737 |
| Sept. 12, 1974 | Japan | 49-105257 |

[51] Int. Cl.$^2$ .................. G03B 23/00; G03B 27/70
[52] U.S. Cl. .......................... 355/60; 354/10
[58] Field of Search ........ 355/71, 57, 66, 46, 355/60, 8, 11, 20, 133; 354/4–10; 340/173 LM; 350/161 W; 346/76 L

[56] References Cited

U.S. PATENT DOCUMENTS

| 2,817,265 | 12/1957 | Covely | 355/20 X |
|---|---|---|---|
| 2,882,792 | 4/1959 | Levine | 355/71 |
| 3,232,689 | 2/1966 | Smith | 355/71 |
| 3,422,737 | 1/1969 | Bailey | 354/6 |
| 3,533,693 | 10/1970 | Balint | 355/71 |
| 3,553,676 | 1/1971 | Raciti | 354/6 X |
| 3,620,140 | 11/1971 | Moyroud | 354/10 |
| 3,687,025 | 8/1972 | Rosin | 354/5 |
| 3,721,991 | 3/1973 | Kaufman et al. | 354/5 X |
| 3,820,123 | 6/1974 | Ammann | 354/9 X |

OTHER PUBLICATIONS

I.B.M. Technical Disclosure Bulletin, vol. 15, No. 5, 10/1972, pp. 1479–1480.
Scanning Method Employing Multiple Flying Spots Per Field J. Belleson, 355–133.
I.B.M. Technical Disclosure Bulletin, vol. 15, No. 5, 10/1972, p. 1481.
Scanning Method Employing Fiber Optics Bundle, J. Belleson, 355–366.

*Primary Examiner*—Donald A. Griffin
*Attorney, Agent, or Firm*—Fitzpatrick, Cella, Harper & Scinto

[57] ABSTRACT

A device for handling output information from an electronic computer or the like at high speed utilizing a light beam, said device including a modulator for modulating a light beam in accordance with an image information signal such as a character, design or other output from a computer or the like, a medium for receiving the modulated light beam, means such as a galvanometer mirror for causing the modulated beam to scan the medium and optical means between the modulator and the scanning means for directing the modulated beam along any one of a plurality of light paths extending to the medium, the optical means being effective to vary the image forming characteristics such as image magnification of the beam incident on the medium.

10 Claims, 6 Drawing Figures

IMAGE INFORMATION HANDLING DEVICE

This is a continuation-in-part of application Ser. No. 607,504, filed Aug. 25, 1975 and application Ser. No. 594,126, filed July 8, 1975.

BACKGROUND OF THE INVENTION

1. Field of the Invention

This invention relates to a recording device for high speed print-out of output information from an electronic computer, etc., and, more particularly, to an optical information recording device, wherein a laser beam, preferably a polarized light beam, is modulated and controlled by a pattern signal such as a figure, character, etc. from an electronic computer, etc., and wherein the size of the recorded information signal for the figure, character, etc. is made variable.

2. Description of the Prior Art

The recording of the character information output from an electronic computer has heretofore been carried out by the use of a drum type or chain type mechanical impact line printer, an optical line printer comprising a combination of an optical character drum and electrophotography, a multi-stylus electrostatic printer, a CRT printer comprising a combination of CRT (chiefly OFT) and electrophotography, or other types of printer. With the mechanical impact printer and the optical line printer, however, it has been impossible to change the size of the recorded characters without slowing down the recording speed. On the other hand, the electrostatic printer in which the character size is changeable has suffered from limited resolving power, and the CRT printer has also been disadvantageous in that it is difficult to maintain a high quality of printing condition for a long period of time in view of the necessity for maintaining stability of the CRT circuit. Thus, these conventional recording devices have encountered various difficulties in changing the size of the output characters from an electronic computer, etc., and in rapidly producing the character output (especially Chinese characters) of high printing quality.

SUMMARY OF THE INVENTION

It is an object of the present invention to provide an image information recording device, in which a light beam is modulated and controlled by an extraneous information signal and recorded on a recording medium, and in which the size of the image information to be recorded is changeable.

It is another object of the present invention to provide an image information recording device capable of changing the size of the image to be recorded, and comprising means for deflecting a polarized light beam, means for modulating the light beam by a pattern information signal such as character, figure, or other type signal in synchronism with the deflection, a recording or displaying medium for the light beam, and optical means for varying the magnification of an image to be formed, when the light beam is focussed on the recording or displaying medium.

It is still another object of the present invention to provide an image information recording device including means for deflecting a polarized light beam such as laser light, etc. so as to effect repetitive scanning in a direction substantially perpendicular to the direction of main polarization, means for modulating the light beam by a pattern signal such as a character, figure, etc. in synchronism with the deflection, and recording means for recording thereon the deflected and modulated light beam, wherein optical means is provided for changing over the incident path of the light beam travelling to the recording means so that the magnification of an image to be formed by the incident light beam on the recording means is varied to enable the size of the recorded images such as characters, figures, etc. to be changed.

It is a further object of the present invention to provide an image information recording device including a generator for a light beam such as a laser beam, etc., a modulator-deflector for the light beam, a recording medium sensitive to the light beam, and optical means for focussing the light beam on the recording medium, wherein the optical means includes means for splitting the path of the light beam, and means for providing a different beam diameter of the light beam in each of the split light paths, whereby the size of the recorded image is made changeable.

It is a still further object of the present invention to provide an image information recording device, in which, by selective use of different beam diameters, the thickness of the lines constituting a recorded image is selectable.

According to the preferred embodiment of the present invention, there is provided a line scanning type laser beam recording device, in which, when characters to be recorded, for example, are written laterally, a laser beam is caused to perform a vertical scanning by a conventional acousto-optic character deflector element in the height direction of the character to be recorded (the direction of column), while the main deflection of the laser beam is moved in the direction of the character lines by the use of a conventional galvanometer mirror, rotary mirror means, etc., wherein, by the use of an optical system having diverse angular magnifications through change-over of the path of the laser light subjected to the vertical scanning, the feature of the laser light recording due to coherent lights can be fully taken advantage of, and, at the same time, the size of the character during high-speed recording can be varied.

According to the preferred embodiment of the present invention, it is possible that, even if the size of the character to be recorded is enlarged, the recording is done without changing the number of picture elements per character to be read out of the character signal generator, and further that the change in the character size does in no way cause reduction in the line recording speed.

The foregoing objects and other objects of the present invention as well as the specific construction and functions of the image information recording device thereof will become fully apparent from the following detailed description of some preferred embodiments of the invention when read in conjunction with the accompanying drawings.

DESCRIPTION OF THE PREFERRED EMBODIMENTS

Several preferred embodiments of the present invention will hereinafter be described in detail with reference to the drawings.

EMBODIMENT 1

Figure 1:
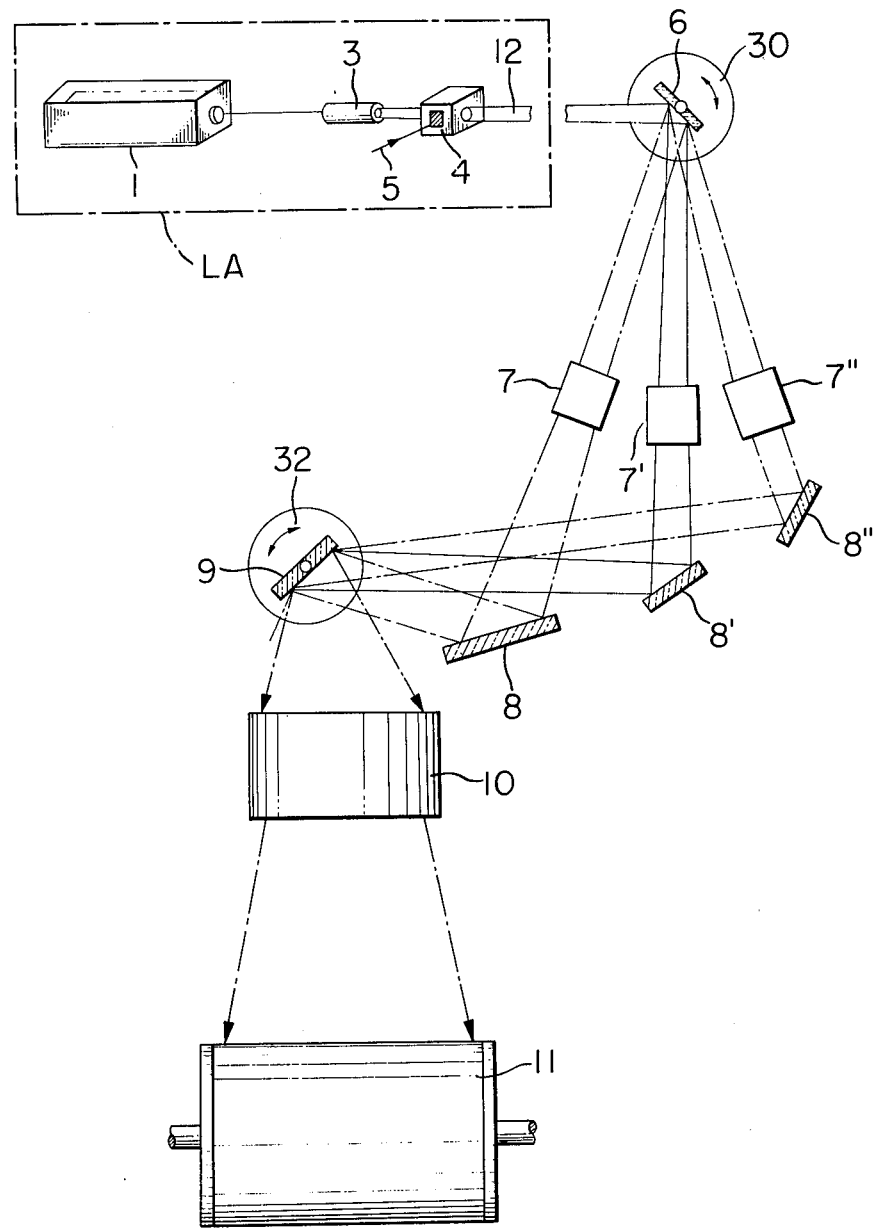
FIG. 1 is a schematic plan view for outlining one embodiment of the device according to the present invention, using, in part, a perspective view.

FIG. 1 is a schematic plan view, partly in perspective, outlining the general construction of a first embodiment of the present invention, which employs a laser oscillator as a light beam generator. In this Figure, a laser beam emitted from the laser oscillator 1 has its beam diameter increased by a first beam expander 3 so as to obtain a necessary resolving power, and enters into a vertical scanning and modulating element 4 which utilizes a known acousto-optic effect. Connected to the element 4 are high-frequency power sources corresponding in number to the vertical picture elements of a character to be recorded and having predetermined frequency differences. (In the case of recording Chinese characters, the number of picture elements per character is 32 dots × 32 dots, so that the number of the high-frequency power sources used is 32.) From these high-frequency power sources, a plurality of ultrasonic waves equal in number to the high-frequency power sources and having predetermined frequency intervals are applied as input to the element 4 either simultaneously or in sequence, as indicated by a reference numeral 5. These ultrasonic waves form phase gratings in the element 4, which correspond to the respective frequencies, and the directions of the laser beam to be diffracted by the respective phase gratings are equal in number to the high-frequency power sources. If the ultrasonic waves from the respective high-frequency power sources are modulated by a character pattern signal so as to conform to the presence of the vertical picture elements of a character to be recorded and then applied to the element 4, there will be provided a group of spots in line corresponding to the character pattern on an image-forming plane by optical means to be described hereinafter. (This modulating technique is known as "the multi-frequency mode".)

The laser beam thus deflected and modulated by such acousto-optic effect modulating element 4 enters into a conventional galvanometer mirror 6, which produces and applies as input to galvanometer mirror driving means 30 a signal representing the character size to be described hereinafter, after which the laser beam is directed, by rotating the mirror 6 at a desired angle, to any one of the optical systems such as, for example, a second group of beam expanders 7, 7' and 7", which are so arranged as to provide an angular magnification corresponding to the size of the character to be recorded. The light paths for changing the character size may be selected in accordance with the number of sizes desired, and any number of such light paths other than that shown in the drawing will also serve the purpose. When the light paths to be employed become great many in number, some of the optical systems will possibly be made common or omitted.

The laser beam which has passed through any one of the beam expanders 7, 7' and 7", is directed to any one of stationary mirrors 8, 8' and 8" which are correspondingly positioned with respect to the beam expanders 7, 7' and 7", and have their angle of inclination set in such a manner that the laser beam may be reflected thereby toward a galvanometer mirror 9 for the above-mentioned main deflection.

The galvanometer mirror 9 is operable by rotation of its driving means 32 to scan the laser beam through an image-forming lens 10 onto a recording medium, for example, a photosensitive drum 11, in a direction substantially parallel to the rotational shaft of the drum 11, according to the electrophotographic process as disclosed in Japanese Patent Publication Nos. 19748/1967 and 24748/1968 (corresponding to U.S. patent application Ser. No. 563,899, filed July 8, 1966) and U.S. Pat. No. 3,666,363. The image-forming lens 10 effects the image-formation of the laser beam on the photosensitive drum 11.

The optical systems 7, 7' and 7" disposed in the abovedescribed paths of the laser beam are not restricted to beam expanders, but may alternatively be a group of prisms so disposed as to change the angular magnifications in the perpendicular direction. If required, the angular magnifications in both vertical and horizontal directions may also be changed. The term "angular magnification" as used herein is a technical term employed in the optical arts and refers to the ratio ($\Delta\theta'/\Delta\theta$) of a small angle $\Delta\theta'$ formed between the optical axis and a light ray passing through an image point thereon, to a small angle $\Delta\theta$ formed between the optical axis and a light ray passing through an object point and which is conjugate therewith.

Figure 6:
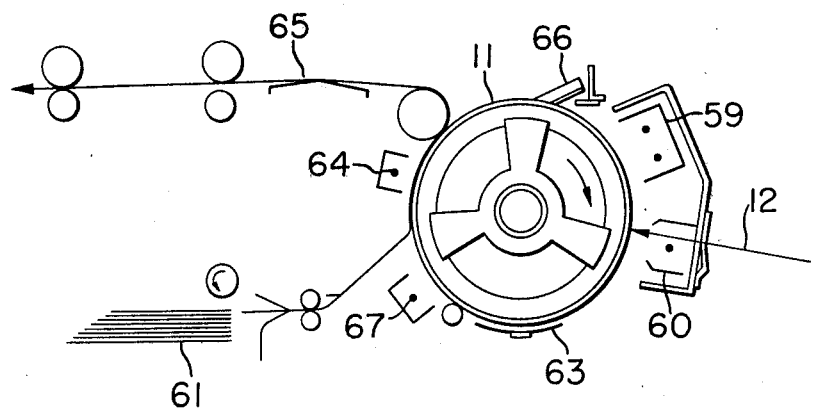
FIG. 6 is a side elevational view showing essential portions of an image recording apparatus, to which the device of the present invention is applicable.

Reference will now be had to FIG. 6 to explain one example of the electrophotographic process which is applicable to the above-described photosensitive drum 11.

As disclosed, for example, in Japanese Patent Publication No. 23910/1967 corresponding to U.S. Pat. No. 3,666,363, the surface of the insulating layer of the photosensitive drum 11 basically consisting of an electrically conductive substrate, a photoconductive layer, and an insulating layer is uniformly charged in advance to the positive or the negative polarity by a first corona charger 59 as shown in FIG. 6 so as to capture the above-mentioned charge polarity and the charge polarity opposite to the pre-charged polarity in the interface between the photoconductive layer and the insulating layer, or in the interior of the photoconductive layer. Subsequently, a laser beam 12 is irradiated onto the surface of the above-mentioned charged insulating layer with simultaneous AC corona discharge being applied thereto from an AC corona discharger 60 to thereby form on the insulating layer surface a pattern resulting from the surface potential difference corresponding to the light-and-dark pattern of the laser beam 12. Thereafter, the entire insulating layer surface is uniformly subjected to overall exposure to cause an electrostatic image of high contrast to be formed on the insulating layer surface, followed by development of such electrostatic image into a visible image by a developing device 63 with the use of a developer mainly consisting of toner particles. Excess liquid developer is then removed by corona discharge from corona discharger 67 and the visible image is then transferred onto paper or like transfer medium 61 by utilization of an internal or an external field, such as corona discharges 64, after which the transferred image is fixed by fixing means 65 such as infrared ray lamp or hot plate to provide an electrophotographically printed image. On the other hand, the insulating layer surface, upon completion of the image transfer, is cleaned by a cleaning device 66 to remove any residual charged particles so as to make the photosensitive plate 11 ready for re-use.

It will be apparent that the recording means applicable to the present invention is not restricted to the above-described electrophotographic process, but any other type of electrophotographic process or different process using silver salt or the like is equally applicable.

Figure 3:
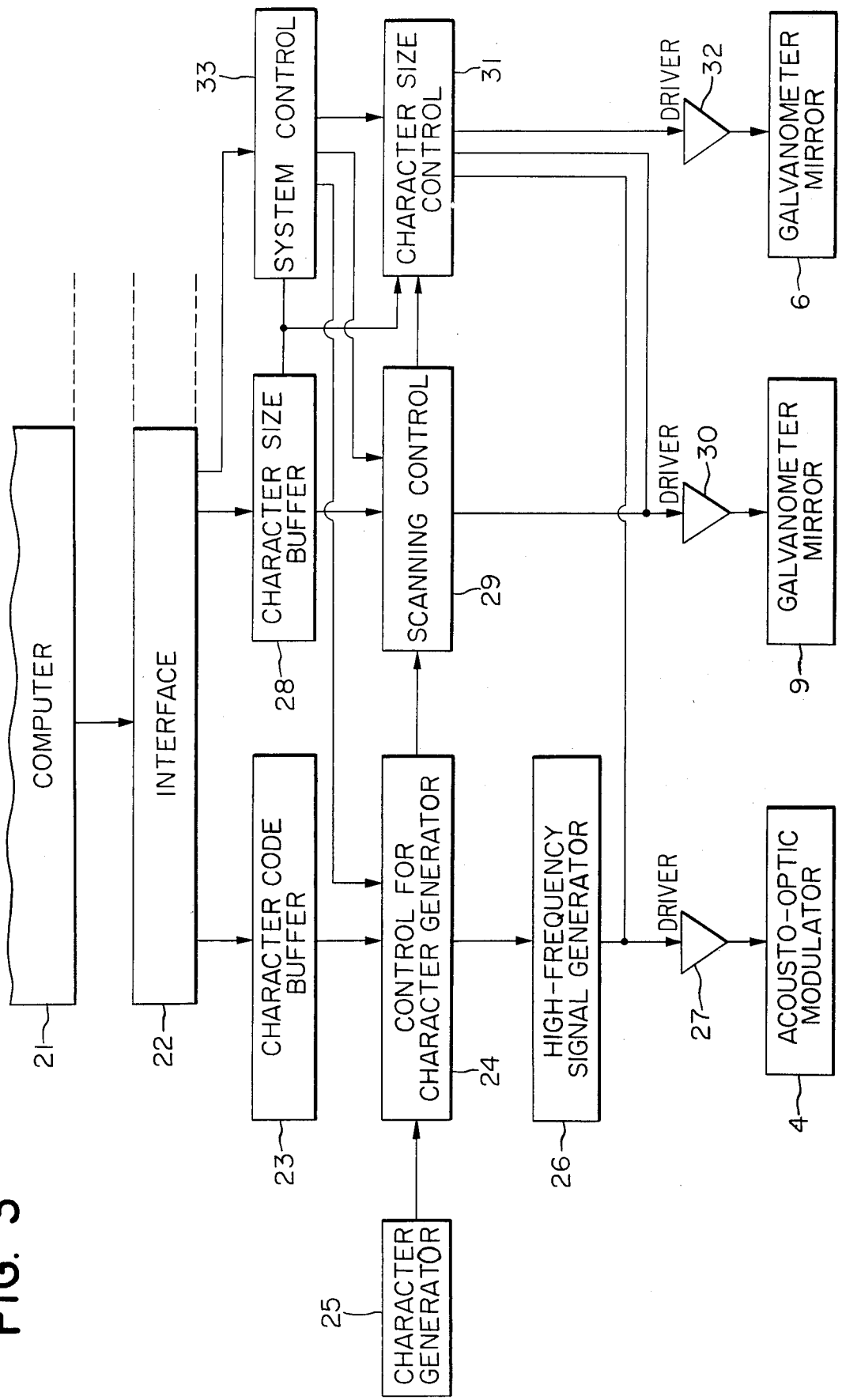
FIG. 3 is a block diagram for explaining the operation of the embodiment shown in FIGS. 1 and 2.

Reference will now be had to the block diagram of FIG. 3 to explain the operation for changing the character size for the required recording.

In the diagram, reference numeral 21 designates an output signal source such as electronic computer or magnetic tape, from which character code signals or character size signals are delivered through an interface 22 to a character code buffer 23 and a character size buffer 28. Designated by 33 is means for controlling the system of the laser recording device according to the present invention, means 33 being connected to the interface 22. The means 33 functions to apply an operation start signal to a character signal generator control 24, a scanning control 29 and a character size control 31, all being connected to the system control means 33.

The abovementioned acousto-optic modulator deflection element 4 is connected to the control 24 through its driver 27 and the high-frequency signal oscillator 26. The galvanometer mirror 9 for main deflection is connected to the scanning control 29 through its driver 30. The light path selecting galvanometer mirror 6 is connected to the character size control 31 through its driver 32.

The directions, in which the signals are given and taken between the various elements in the block diagram, are indicated by arrows. Operations of the system will now be discussed hereinbelow.

The character size signal, delivered to the character size buffer 28 from the signal source 21 such as an electronic computer, etc. through the interface 22, is applied to the character size control 31 to cause the light path selecting galvanometer mirror 6 to rotate through the conventional galvanometer mirror driver 32, thereby selecting a light path through one of the beam expanders 7, 7' and 7", e.g. the one designated by 7, in FIG. 1. At the same time, a signal for controlling the scanning start position of the galvanometer mirror 9 so as to scan the photosensitive drum 11 with an equal width (vide FIG. 1), irrespective of whichever light path is selected, is delivered through the scanning control 29 to the galvanometer mirror driver 30. This driver 30 is actuated by the input of both signals from the scanning control 29 and the control 31 combined.

A signal for maintaining constant the recording density irrespective of any variation in the character size (for example, as the quantity of laser light per unit time is constant, the amplification gain during the laser beam modulation, every time the character size is enlarged, must be increased) is delivered to the driver 27 which constitutes the power source for the acousto-optic modulator deflecting element 4, thereby completing the preparations for writing-in.

After confirming that the above-described operations of character size change has been completed in the entire system including the recording apparatus shown in FIG. 6, and that all preparations for writing-in has been completed, the system control 33 delivers the operation start signal to the scanning control 29 and the character signal generator control 24. Simultaneously therewith, a character pattern signal is read, with suitable timing, out of the character signal generator 25 by a character code buffered by the character code buffer 23, and a high-frequency signal is applied through the high-frequency signal generator 26 and the drive 27 to the acousto-optic modulator deflection element 4. Thereupon, the element 4 causes the incident laser beam to diffract in the vertical direction, and it repeats the vertical scanning and modulation in a sequential manner from one end to the other of the character pattern. The galvanometer mirror 9 for the main deflection is repetitively driven by the galvanometer mirror driver 30, which is actuated by an input signal from the scanning control 29 and an input control signal from the character size control 31, thereby effecting the line scanning in synchronism with the vertical scanning of the modulator element 4. In this manner, for example, a character pattern for one line is exposed on the photosensitive drum 11 in the direction from left to right, and recorded on ordinary paper through the image recording process as disclosed in the afore-described prior art such as Japanese Patent Publication No. 23910/1967 corresponding to U.S. Patent No. 3,666,363.

When changing the character size, the beam expanders 7' or 7" defining other light paths may be selected in accordance with the desired character size, whereby there can be obtained, on the photosensitive drum 11, a train of laser light spots of enlarged or reduced size as compared to the spots formed when the beam expander 7 is used 7. In this case, for the magnification ratio in the direction of the main deflection to be made equal to the angular magnification ratio, it is desirable to control the timing for the modulation of the high-frequency power source by the character pattern without changing the scanning velocity of the galvanometer mirror 9. If, in this instance, the moving speed of the recording medium is variable at any time in the direction of auxiliary deflection (the direction of rotation of the drum 11), the same purpose may be achieved by changing the moving speed of the recording medium and the line scanning speed of the galvanometer mirror 9, while maintaining constant the timing for the modulation of the element 4.

Further, a character or symbol having a different vertical-horizontal ratio may be obtained by changing the timing for the modulation of the element 4.

The arrangement of FIG. 1, as will be appreciated from the foregoing explanation, is intended to control the high-frequency input to the acousto-optic modulator deflection element 4 in accordance with changes in the character size so as to maintain constant the recording density in the recording apparatus.

Figure 2:
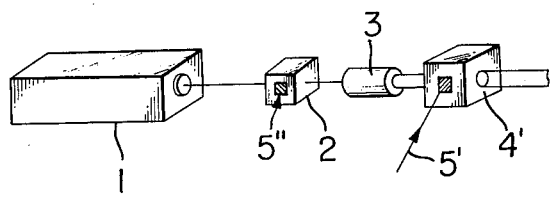
FIG. 2 is a perspective view of a modification of the portion in perspective as shown in FIG. 1.

FIG. 2 shows a modification of the portion of the FIG. 1 arrangement encircled by dot-and-dash line LA. In this modification, it is desirable that the required control be effected by providing a modulator for the laser in the light path extending from the laser oscillator 1 to the galvanometer mirror 6 (desirably between the laser oscillator 1 and the beam expander 3).

In the above-described embodiment, when the light path is to be selected in accordance with a particular character size, the rotational position of the galvanometer mirror 6 and the scanning start position of the mirror 9 must be set properly. For this purpose, the rotational positions of the galvanometer mirrors 6 and 9 may be detected by the position detections due to variations in the electric capacities attached to the rotating shafts of the mirrors 6 and 9, or by causing the detecting light from a light source for the position detection to be projected upon the galvanometer mirrors 6 and 9, the reflected light of which is impinged on a photoelectric element by causing it to pass through a slit or by utilization of a diffraction grating so as to effect the positional detection and feeding back of a detection signal, or by using such a detection signal as the line scanning start signal, especially in the case of the mirror 9, to accomplish the rotational position control of the mirror 9.

The above embodiment has been described chiefly with respect to the case of lateral or horizontal writing, but vertical writing may likewise be effected if the direction in which character pattern signals are read out is changed by 90°.

In the foregoing explanation, the signal 5 (see FIG. 1) entering into the acousto-optic modulator deflection element 4 comprised a plurality of high-frequency signals having substantially fixed frequency intervals modulated by character patterns.

In the modification of FIG. 2, on the other hand, a high-frequency signal 5', the frequency of which linearly varies with time, is applied to the acousto-optic deflection element 4' to effect the vertical deflection of the character (this method is known as "the linear frequency modulation mode"), and, in synchronism with this high frequency signal input, a character pattern signal 5" is applied to the modulator 2 as an input. Again, in this case, the character size may be changed by a method similar to the multi-frequency mode in the above-described embodiment. Also, if the number of light paths is large, the galvanometer mirrors 6 and 9 may be replaced by a set of galvanometer mirrors, the rotational shafts of which are orthogonally intersected, and the optical systems such as beam expanders, etc. are disposed in a three dimensional way.

EMBODIMENT 2

Figure 4:
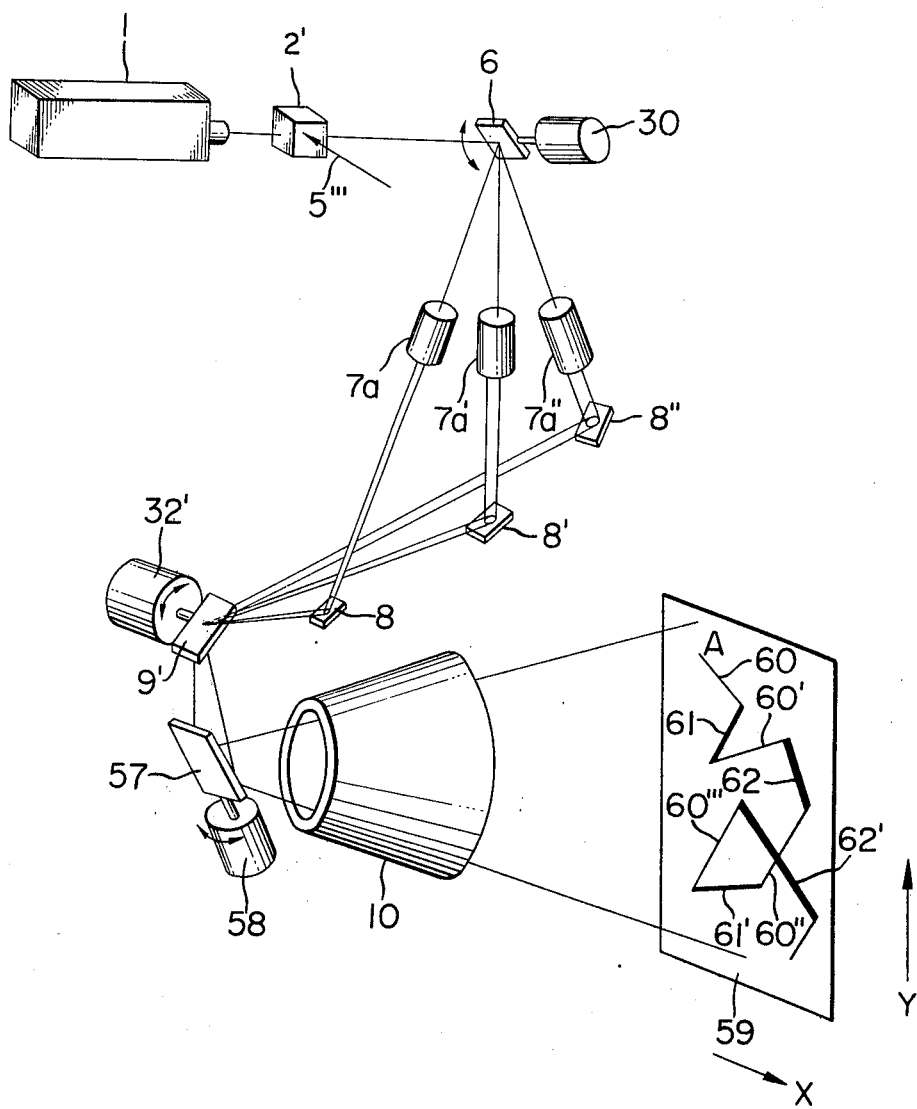
FIG. 4 is a perspective view for outlining another embodiment of the device according to the present invention.

FIG. 4 shows an image recording or display device having a laser light source, means for modulating and deflecting the laser light, a laser light sensitive recording medium, and optical means for image-forming the laser light on the recording medium, wherein the above-mentioned optical means is provided with means for splitting the light path of the laser light and means capable of providing different beam diameters for each of the split light paths to thereby save the number of scannings. In FIG. 4, those elements common to the first embodiment are designated by same reference numerals. Laser oscillator 1, light modulator 2', light path selecting galvanometer mirror 6 and the driver 30 therefor, reflection mirrors 8, 8', 8", and the $f\text{-}\div$ lens 10 are identcial with those elements already described. A galvanometer mirror 9' causes light beam incident thereon to scan a recording or display medium 59 in the Y direction, and a member 32' is a driver therefor. A galvanometer mirror 57 causes light beam incident thereon to scan the recording or display medium 59 in the X direction, and a member 58 is a driver therefor.

In FIG. 4, the laser beam emitted from the laser oscillator 1 is modulated by a modulator 2', e.g., an acousto-optic modulation element, with an image or the like information signal 5''' being applied thereto as an input. Further, a signal representing thickness of the line to be written is applied to the driver 30 as an input, whereby the galvanometer mirror 6 is deflected so that the laser light passes through one of the beam expanders 7a, 7a' and 7a" which respectively differ in magnification. For example, if the ratio of magnification among the beam expanders 7a, 7a' and 7a" is 1 : 2 : 3, the laser beam passed through them increases its diameter in proportion to the magnifications of the respective beam expanders, while the angles of divergence resulting from diffraction become smaller in inverse proportion to the magnifications. The laser beam passed through the beam expander 7a, 7a', or 7a" is reflected by a stationary reflection mirror 8, 8' or 8" so as to be projected on the galvanometer 9'. This mirror 9' is deflected to control the scanning start position so that the respective incident light beam from the beam expanders may scan the same region of the recording or display medium 59 in the Y direction thereof. The light reflected by the galvanometer mirror 9' is therefore deflected in the X direction by the galvanometer mirror 57 and, the deflected light is image-formed on the laser-sensitive recording medium 59 such as, for example, silver salt recording paper, through the image forming lens 10 having the $f\text{-}\theta$ characteristic. The laser-sensitive medium 59 is not restricted to silver salt, but may be any material such as photosensitive organic photoconductor (OPC) in electrophotography which is sensitive to laser light and capable of recording or displaying an image thereon. A spot diameter of the laser light passed through each of the beam expanders 7a, 7a', 7a" is at a ratio of 3 : 2 : 1. For a pattern comprising a combination of straight lines having different thickness as shown in FIG. 4 to be recorded or displayed, the following procedures will be followed. If the ratio of thickness among a series of straight lines originating from a point A on the laser-sensitive medium 59 is such that it is 1 for lines 60, 60', 60", 60''', 2 for lines 61, 61' and 3 for lines 62, 62', the laser light from the oscillator is caused to pass through the beam expander 7a" by first deflecting the galvanometer mirror 6 to a desired position, followed by deflection of the laser light by the galvanometer mirrors 9' and 57 to record the line 60. Next, the galvanometer mirror 6 is further rotated for a predetermined angle so as to cause the laser beam to pass through the beam expander 7a', while, at the same time, the modulator 2' is controlled to increase the quantity of light so as to ensure a constant recording density irrespective of any variation in thickness of the lines on the laser-sensitive medium 59. Subsequently, the beam expander 7a" is again selected to depict the line 60', and the galvanometer mirror 6 is further rotated to control the light quantity so as to select the beam expander 7a, whereby the thickest line 62 is depicted on the laser-sensitive medium 59. In a similar manner, lines 60", 61', 60''' and 62', each being different in thickness, may be recorded in succession.

In addition, when it is desired to depict curve lines with different thicknesses, or to paint a certain definite area of the sensitive medium, the selection of the light paths in the same manner as above serves to reduce the number of the scanning frequency.

Also, the means for deflecting the laser beam on the laser-sensitive medium 59 may, of course, be a combination of the galvanometer mirrors, rotary polygonal mirrors, acousto-optic deflection element, electro-optic deflection element, etc.. Alternatively, a combination of the auxiliary scanning by movement of the laser-sensitive medium and the above-mentioned deflector means may be employed.

In the above-described embodiment according to the present invention, if the beam diameter is constant, a single scanning operation suffices to draw the lines, whereas, in the prior art device two scannings are necessary for drawing the lines 61 and 61', and three scannings are necessary for drawing the lines 62 and 62'. On the other hand, if the beam diameter is constant, increase or decrease in the beam diameter to some extent is possible by varying the quantity of light, but it is impossible to maintain the recording density constant.

In the present embodiment, the quantity of light is varied in accordance with thickness of the lines to provide a constant recording density, whereas such constant density may also be obtained by varying the deflection factors of the galvanometer mirrors 9' and 57 in accordance with the line thickness.

For the change-over of the light paths, use may also be made of a combination of the rotating deflector element and the polarized beam splitter.

By the afore-described embodiment, it is possible to achieve, in a laser recording system, especially, recording of information such as patterns and images, the diversity in expression as required in the recording of patterns or the like (for example, various line thicknesses) by varying the image-forming diameter of the laser beam without changing the frequency and velocity of the scanning by the laser beam.

According to the present invention, even a thicker line than a standard-sized line can be recorded with the same scanning frequency as in the case of recording the standard-sized line by utilizing a plurality of laser light spots which form the image by becoming contiguous with each other through variations in the angular magnification due to change-over of the light path as well as the acousto-optic element. Also, exposure of a predetermined area can be achieved with a reduced scanning frequency, whereby the scanning operation becomes easy in comparison with a case where the image-forming diameter is constant.

EMBODIMENT 3

In this embodiment, for the purpose of changing-over the light path at a higher speed than in the first embodiment, there is used an element capable of varying the polarization of the laser light by electrically or magnetically rotating the plane of polarization.

Figure 5:
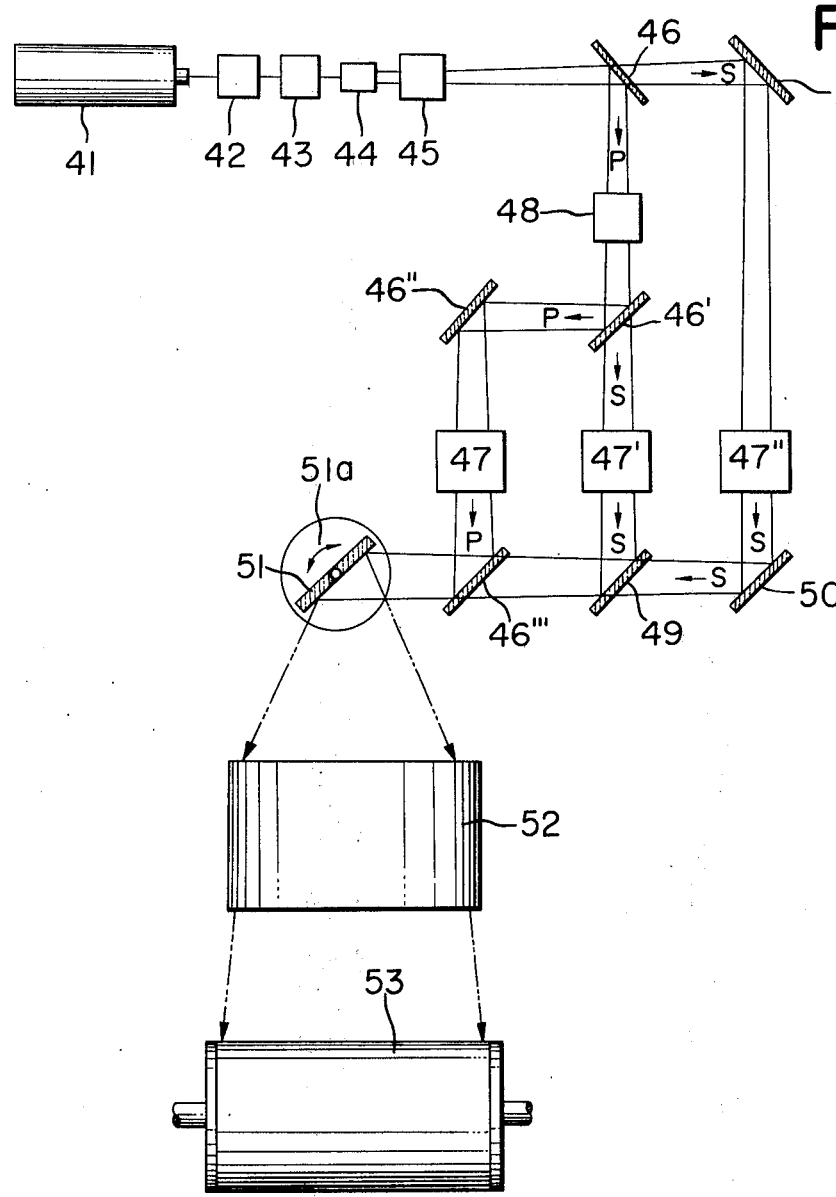
FIG. 5 is a plan view for outlining still another embodiment of the device according to the present invention.

In FIG. 5, the laser light emitted from an oscillator 41 is rectilinearly polarized light (if not, the beam is rectilinearly polarized by the use of a polarizer, a phase plate, and so on), and modulated by a character pattern signal at a modulator 42, after which the beam is projected upon a Pockels cell 43 formed of, for example, electro-optic crystal, the plane of polarization of which is electrically or magnetically rotatable. The cell 43 may be a Farady cell or any other cell that can control rotation of the polarization plane. By a voltage applied to the cell 43, the laser beam can be made to have its vibration direction of polarization parallel to the plane of the drawing sheet of FIG. 5 (this will hereinafter be referred to as "P polarization") and its vibration direction of polarization normal to that plane (this will hereinafter be referred to as "S polarization). The laser beam which has expanded its diameter by a beam expander 44 so as to have a sufficient resolving power on the recording surface enters into the acousto-optic deflection element 45, same as in the first embodiment, and is deflected in the vertical direction of the character to be recorded. (In case of the multi-frequency mode, the modulator 42 may be omitted.) Beam splitters 46, 46', 46" and 46'" are all polarization beam splitters, each having a reflection factor of approximately 100% with respect to the P polarization, and a transmission factor of about 100% with respect to the S polarization. Assuming that the laser light leaving the Pockels cell 43 with a suitable voltage being applied to the cell 43 is the S polarization, almost all of the laser light will pass through the beam splitter 46, will be reflected by a reflection mirror 50 having a reflection factor of approximately 100% with respect to the S polarization, will further pass through an optical system "47" which is one of plurality of beam expanders 47, 47' and 47", and will be again reflected approximately 100% by a mirror 50' similar to the beam splitters 50 to reach a galvanometer mirror 51 by way of mirrors 49 and 46'". On the other hand, the laser light rendered into the P polarization by the cell 43 will be reflected approximately 100% by the beam splitter 46 and pass through the Pockels cell 48 which is similar to the cell 43. By application of a suitable voltage to the cell 48, the laser light exiting from the cell 48 may remain P polarized, and will be reflected approximately 100% by the beam splitters 46' and 46" so as to pass through the beam expander 47, after which the light is reflected by the beam splitter 46" to be projected on the well-known galvanometer mirror 51. The mirror 51 is vibrated at a high speed by its driver 51a to effect the scanning.

Also, when an appropriate voltage is applied to the cell 48 to render the laser light S polarized, the laser light will pass through the beam splitter 46' and beam expander 47', will then be reflected by the beam splitter 49, and will further pass through the beam splitter 46'" to be finally projected into the mirror 51. The mirror 51 has a metallic reflecting surface, by which the laser light is reflected independently of its polarizing characteristic and passes through an image-forming lens 52 to form an image on a photosensitive drum 53, in the same manner as described with respect to the first embodiment. Thus, by the application of suitable voltages to the cells 43 and 48, a light path passing through any desired one of the beam expanders 47, 47' and 47'" may be selected with the result that recording of characters having varied sizes can be accomplished as in the first embodiment.

When the reflection factor of the beam splitter 49 with respect to the S polarization is made approximately 100%, the laser light which has passed through the elements 50, 47" and 50' becomes hardly able to pass through the splitter 49, so that, when the splitter 49 is so designed that, for example, its reflection factor is about 0.6 and its transmission factor is about 0.4, both with respect to the S polarization, a ratio of the light quantity of the laser light passing through the beam expanders 47, 47' and 47" becomes respectively 1 : 0.6 : 0.4. By making the ratio of the light quantity correspond to a desired character size, the adjustment of the quantity of light accompanied by the change in the character size in the first embodiment can be simplified.

In the present embodiment, the change-over time for the character size is determined by the activation time of the Pockels cell. It is easy to provide an activating time of the order of 10 micro-seconds which is necessary to change each character size in a Chinese character printer.

Although the above-described beam splitters 46, 46', 46", 46'", 49 and reflection mirrors 50, 50' are all polarized, the beam splitters 46'" and 49 may be replaced by conventional half-mirrors, and the mirrors 50, 50' and beam splitter 46" may also be substituted for conventional total reflection mirrors. In this case, however, loss of light quantity will become prohibitive.

When only two light paths are enough, the beam splitters 46', 46", and 46''' may be omitted along with beam expander 47 and Pockels cell 48 and the beam splitter 49 may be replaced by the beam splitter 46', whereby a transmission factor of approximately 100% may be obtained in both light paths. On the contrary, when it is desired to increase the number of light paths, this may be realized by increasing the number of the Pockels cells as in the case where three light paths are provided.

While polarizing beam splitters have been employed to separate the P and S polarizations, use may also be made of composite polarizing prisms such as dual nicol prisms, Wollastone prisms, etc.. In this case, the light path arrangement may be a modification of the FIG. 5 arrangement. Further, a digital deflector using a combination of electro-optic crystal and double refraction crystal, or deflecting prism, may be employed for the light path selection.

While any of the foregoing embodiments has been shown to use laser light as the light beam, the present invention is not restricted to these, but any polarized light beam may, of course, be equally used.

We claim:

1. A device for projecting a light beam onto a light beam sensitive medium by modulating the light beam with an image information signal, said device comprising:
    means for modulating a light beam;
    means for causing the light beam to scan in a first direction with respect to the sensitive medium;
    means for causing the light beam to scan in a second direction perpendicular to said first direction;
    means for image-forming the light beam on the sensitive medium in the form of a spot after scanning in both said first and second directions; and
    means for selectively directing the light beam along any one of a plurality of paths to said image-forming means including optical means extending along said plurality of paths to said image-forming means for varying the diameter of the light beam directed along one of said paths to a magnification different from that along any other path and further including means for directing the light beam from said optical means so that it impinges said image-forming means.

2. An image information processing device, comprising:
    means for deflecting a light beam;
    means for modulating the light beam by a pattern signal in synchronism with said deflection;
    means for polarizing the light beam;
    means sensitive to the light beam as deflected and modulated;
    means disposed in the path of said light beam for varying the plane of polarization of said polarized light beam; and
    means for directing a light beam having a different plane of polarization to a different light path, whereby the magnification of said light beam on said sensitive means can be varied.

3. A device according to claim 2, wherein said means for varying the plane of polarization includes a variable member, the polarizing characterisitc of which is variable in response to an external signal applied thereto.

4. A light information recording device, comprising:
    a light beam generator;
    a light modulator for modulating the light beam generated from said generator, by an external information signal;
    a galvanometer mirror for automatically defining the path for the modulated light beam by an external signal;
    a plurality of beam expanders along a plurality of beam paths, each beam expander providing a different magnification of beam diameter of the light beam when the beam passes therethrough;
    reflector means disposed on the output side of said beam expanders for directing the light beam to a common scanning means; and
    an optical lens for image-forming the scanned light beam on a light beam recording medium;
    whereby light information of a desired magnification may be recorded by the selection of any one of said light beam paths.

5. An image information processing device, in which a light beam is modulated by an image information signal and the modulated light beam is focussed on a light beam sensitive medium, said device comprising:
    a light beam generator;
    means for providing, a character code signal and character size signal;
    an interace circuit;
    a buffer circuit for said character code signal;
    a buffer circuit for said character size signal;
    a character generator;
    control means connected to said character code signal buffer circuit, said character size signal buffer circuit and said character generator, said control means controlling systematically the generation of a high-frequency signal for light beam modulation, the scanning of the light beam, and the change character size;
    a high-frequency signal oscillator connected to said control means;
    driver means for scanning means connected to said control means;
    driver means for character size changing optical means connected to said control means;
    a light beam modulator connected to said high-frequency signal oscillator;
    optical scanning means connected to said driver means for scanning means; and
    character size changing optical means connected to said driver means for the character size changing optical means,
    said optical scanning means and said character size changing optical means being operated in a predetermined relationship by said control means, and said character size changing optical means being operated in response to a character size changing signal input.

6. An image information handling device comprising:
    means for modulating a light beam by an image information signal;
    a medium for receiving the modulated light beam;
    scanning means for causing the modulated beam to scan said medium; and
    optical means between said modulating means and said scanning means for selectively directing the modulated beam along any one of a plurality of light paths extending to said medium, said optical means also being effective to vary the image forming characteristic of the light beam incident on said medium.

7. A device according to claim 6, wherein said optical means for selectively changing over the light path includes:
   a plurality of beam diameter changing optical members, each having different angular magnification; and
   a movable light path selecting member capable of selectively directing the light beam to any one of said plurality of optical members.

8. A device according to claim 1, further including means for polarizing the light beam and wherein said optical means for selectively changing over the light path includes:
   a plurality of beam diameter changing optical members, each having different angular magnification; and
   an optical member for selecting an optical path by changing the polarizing characteristics of the polarized light beam;
   said optical member being effective to direct the light beam to any one of said plurality of beam diameter changing optical members.

9. A device according to claim 6, wherein said optical means for selectively changing over the light path includes:
   a galvanometer mirror capable of selectively directing the modulated light along any one of said plurality of light paths; and
   beam expanders provided on the reflection side of said mirror and located in each of said plurality of light paths to vary the diameter of said beam 10. A device according to claim 6, wherein said medium is sensitive to the light beam.

* * * * *

UNITED STATES PATENT OFFICE
CERTIFICATE OF CORRECTION

Patent No. 4,060,322　　　　　　　　Dated November 29, 1977

Inventor(s)　　KAZUHIRO HIRAYAMA, ET AL

It is certified that error appears in the above-identified patent and that said Letters Patent are hereby corrected as shown below:

Col. 7, line 53, "f- $\div$ lens 10" should read --f- $\theta$ lens 10--;

Col. 7, line 54, "identcial" should read --identical--;

Col. 10, line 10, "47" should read --47"--;

Col. 10, line 13, after "the" delete "beam splitter" and insert --mirror--;

Col. 10, line 14, delete "mirrors" and insert --beam splitters--

Col. 11, line 10, delete "the" (second occurrence);

Claim 3, Col. 11, line 66, "characterisitc" should read --characteristic--;

Claim 5, Col. 12, line 25, delete "," after "providing";

Claim 5, Col. 12, line 36, insert --in-- after "change";

Claim 9, Col. 14, line 15, insert a period after "beam".

Signed and Sealed this

Eighteenth Day of April 1978

[SEAL]

Attest:

RUTH C. MASON　　　　　　　　LUTRELLE F. PARKER
Attesting Officer　　　　　Acting Commissioner of Patents and Trademarks